July 26, 1960     F. E. ABERER ET AL     2,946,362
FOOD SLICER BLADE ENGAGEMENT
Filed May 11, 1959
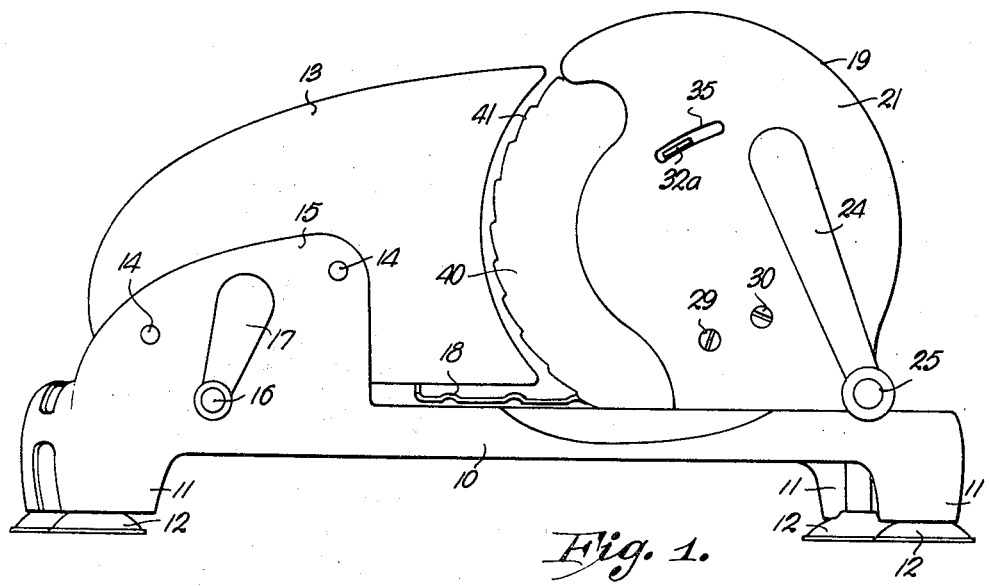
Fig. 1.
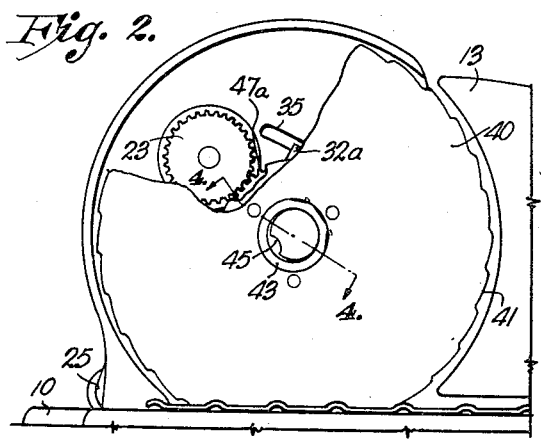
Fig. 2.
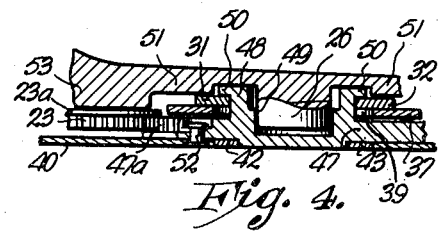
Fig. 4.
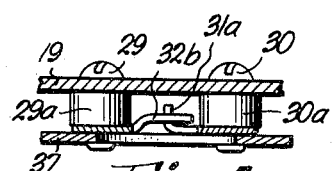
Fig. 5.
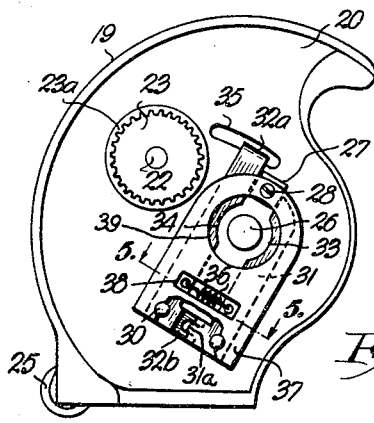
Fig. 3.
Fig. 6.
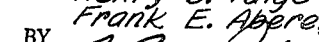
INVENTORS.
Henry J. Talge
Frank E. Aberer
BY
ATTORNEY.

United States Patent Office 2,946,362
Patented July 26, 1960

2,946,362
FOOD SLICER BLADE ENGAGEMENT

Frank E. Aberer, Fairway, Kans., and Henry J. Talge, Kansas City, Mo.; said Aberer assignor to said Talge, % Rival Manufacturing Co., 36th and Bennington, Kansas City, Mo.

Filed May 11, 1959, Ser. No. 812,316

6 Claims. (Cl. 146—102)

This invention relates to improvements in food slicing machines and refers more particularly to improvements in means for engaging and disengaging the slicing blade from the cutting head of a food slicing machine.

Food slicers have been available on the commercial market for a substantial period embodying a relatively standardized form. Typical slicers of this type are shown in the patent to Talge et al., No. 2,848,028, "Food Holding Arrangement for Food Slicers," issued August 19, 1958, and the patent to H. J. Stolbach, No. 2,859,785, "Food Slicer Having Safety Switch," issued November 11, 1958. Such slicers conventionally include a circular slicing blade having an extremely sharp peripheral edge. Such blade is conventionally mounted in a concave cutting head which encloses substantially 180° of the blade for safety, leaving a free portion of the blade for the slicing purpose and passing a lower portion of the blade into a slot in the platform of the slicer. The blade is generally rotated by an operating handle which is mounted on one end of a shaft carrying a gear on the other end, said latter gear engaging a second gear fixed to the inner side of the circular slicing blade.

Periodically, it is both necessary and desirable to remove the blade from the cutting head for cleaning of the blade, the cutting head or the food slicer proper. Additionally, repairs may have to be made to the slicer or the blade sharpened. Handling the razor sharp, fairly heavy blade is at all times a somewhat hazardous operation and particularly so if the hands or the fingers of the operator are wet or greasy. Therefore, it would be extremely useful to provide means for engaging and disengaging the food slicer blade which would provide a maximum amount of protection to the operator's hands at all times. Furthermore, it would be desirable to provide an engagement between the cutting head and the slicing blade which would permit both ready engagement and disengagement of the blade with the cutting head, but at the same time, would provide an extremely positive, solid engagement which would offer no hazard of the blade coming off its mounting shaft at any time during the life of the slicing machine due to wear or lateral force applied to the blade.

Therefore, an object of the instant invention is to provide engaging and disengaging means for a slicer blade in a food slicer which offer maximum protection to the operator at all times during the engaging and disengaging procedure and wherein the hands of the operator never close over or grasp the sharp edge of the blade at any time.

Another object of the invention is to provide engaging and disengaging means for a food slicing machine wherein the engagement is extremely positive and one which will not permit disengagement or removal of the blade from the slicer cutting head without positive action on the part of the operator.

Another object of the invention is to provide engaging and disengaging mechanism for the cutting head of a food slicer wherein the operator's hands are always centrally positioned of the blade on both sides thereof at all stages in the disengaging and engaging procedures.

Another object of the invention is to provide engaging and disengaging mechanism for the cutting head of a food slicer which is relatively simple, relatively inexpensive to manufacture, extremely positive in action, and has a long life of service under hard use.

Other and further objects of the invention will appear in the course of the following description thereof.

In the drawings, which form a part of the instant invention and are to be read in conjunction therewith, an embodiment of the invention is shown and, in the various views, like numerals are employed to indicate like parts.

Fig. 1 is a side elevation of a typical food slicer embodying the invention.

Fig. 2 is a partial side view of the cutting head with the blade mounted thereon, a portion of the blade cut away to indicate the blade drive mechanism.

Fig. 3 is a view similar to that of Fig. 2 with the blade removed and with parts of the engaging and disengaging mechanism shown in dotted lines.

Fig. 4 is an enlarged view taken along the line 4—4 of Fig. 2 in the direction of the arrows.

Fig. 5 is an enlarged view taken along the line 5—5 of Fig. 3 in the direction of the arrows.

Fig. 6 is an enlarged view of the grasping handle on the outer face of the slicer blade with the handle raised out of the blade recess.

Referring to the drawings, at 10 is shown the platform of a conventional slicing machine having four upstanding supporting legs 11 mounted on suction cups 12. A spacer is provided for regulating the thickness of slices of food. Spacing plate 13 is supported by a pair of guides 14 fixed to spacing head 15. A handle 16 on arm 17 regulates the distance of the spacing plate 13 from head 15 substantially in the manner shown in the Stolbach Patent No. 2,859,785. A tray or bed 18 is mounted on the platform 10 to receive the food to be sliced. All of the aforementioned elements are conventional in the art and do not form a part of the instant invention.

A cutting head or housing 19 is fixed to the platform 10 and has a concave inner side 20 best seen in Fig. 3 and a convex outer side 21 best seen in Fig. 1. A shaft 22 is rotatably mounted in the cutting head 19, extends therethrough and has drive gear 23 integrally formed with plate 23a fixed to one end thereof and handle arm 24 and handle 25 to the other end thereof. Rotation of handle 25 rotates gear 23.

Stub shaft 26 is mounted on the inner face 20 of cutting head 19 and extends parallel to shaft 22. An abutment block 27 is fixed to the face 20 of cutting head 19 by screw 28. Screws 29 and 30 (Fig. 1 and Fig. 3) extend through openings (not shown) in the cutting head 19 and are fixed in spacers 29a and 30a encircling the shafts thereof as seen in Fig. 5. Abutment block 27 may be attached to and is a part of inner face 20 of cutting head 19, as may be the spacers 29a and 30a of Fig. 5. A pair of engaging arms 31 and 32 are pivotally mounted on the screw shafts 29 and 30, respectively, the free ends of the arms extending past stub shaft 26. Arms 31 and 32 have curved indentations 33 and 34 adjacent the free ends thereof encircling stub shaft 26. With the inner sides of arms 31 and 32 abutting block 27, the curved indentations 33 and 34, if continued, would form a circle. The upper end 32a of arm 32 is outwardly bent and extends through slot 35 in the cutting head 19 whereby to extend outwardly adjacent the handle arm 24. A resilient spring 36 joins the arms 31 and 32 above their pivotal mounting on shafts 29 and 30, whereby to normally maintain the inner faces of arms 31 and 32 in abutment with block 27. Engaging arm 32 has an inwardly offset double extension 32b, which underlies and straddles a right angled single extension 31a of the pivoted end of arm 31.

With this structure movement of arm 32 to the left or right in Fig. 3 by pressure on the arm portion 32a will act to cam arm 31 away from or toward stub shaft 26. A positioning frame 37 lies over the arms 31 and 32 and is received on the top surfaces of block 27 and spacers 29a and 30a above arms 31 and 32. The head of screw 28 overlies the frame 37, as do the ends of screws 29 and 30. Frame 37 has an opening 38 over spring 36 and an opening 39 through which stub shaft 26 extends.

Slicer blade 40 has peripheral cutting edge 41. On the outer side of the blade (Figs. 2 and 6), a recess 42 of ring configuration is provided. A ring-shaped grasping handle 43 is pivotally mounted at one side thereof in a groove (not shown) at one side of recess 42 by arms 44. Thus handle 43 may be lifted up as in Fig. 6 or pushed into recess 42, as in Fig. 2 flush with the surface of the blade. A finger end receiving depression 45 is formed in the wall of the circular central portion of the blade surrounded by recess 42 and groove 46 is provided in the base of the recess 42 so that the operator may readily lift the handle 43 from the recess 42.

On the other inner side of the blade is centrally fixed a second gear 47a integrally formed with plate 47 to engage with and be driven by gear 23. This blade drive construction is conventional. A hollow post 48 (Fig. 4) is fixed centrally of gear 47 and blade 40 having recess 49 centrally thereof. Recess 49 is stepped from an outer greater diameter than the diameter of stub shaft 26 to a diameter only slightly greater than the outer diameter of stub shaft 26 whereby to fit snugly therearound in the lower depths thereof. An outwardly-extending peripheral rim 50 is provided of a thickness substantially equal to and not greater than the distance the arms 31 and 32 are spaced upwardly above the base of the stub shaft 26 by raised portion 51 of the inner face of the cutting head 19. Raised portion 51 of the cutting head inner face 20 runs circumferentially to the stub shaft 26 and is substantially equal to the height of the block 27 less the thickness of the arms 31 and 32. By means of raised portion 51, arms 31 and 32 are supported above the level of the cutting head inner face 20 immediately circumferential to stub shaft 26 a sufficient distance that the arms 31 and 32 can engage and disengage the face of the rim 50 next gear 47 as the arms 31 and 32 are moved inwardly and outwardly. Gear 47 is fixed to blade 40 by studs 52 circumferentially spaced on the gear. Drive gear 23 is spaced outwardly from the inner face 20 of cutting head 19 by pedestal 53.

In operation of the inventive construction, with the blade assembled on the cutting head as shown in Figs. 2 and 4, disengagement of the blade 40 from the stub shaft 26 is accomplished by counterclockwise motion of arm portion 32a in Fig. 2. This cams arms 31 and 32 apart whereby arms 31 and 32 do not overlie rim 50. In the meantime, the operator lifts the handle 43 from recess 42 as in Fig. 6 and grasps handle 43 by extending a finger therethrough. With one finger of one hand of the operator moving arm portion 32a in a counterclockwise direction, and another finger of the other hand of the operator grasping handle 43, neither hand nor any fingers of either hand of the operator is positioned adjacent or over the sharp edge of the blade. With arms 31 and 32 cammed apart to free rim 50, the operator may pull blade shaft 48 out of frame opening 39. Release of arm portion 32a permits arms 31 and 32 to spring back to the position of Fig. 3. The operator may then place the blade down and either clean the blade or accomplish whatever task he desires with the cutting head.

To replace the blade, the operator again grasps the handle 43 of the blade in the position of Fig. 6 and, with the other hand, pulls the arm portion 32a in a counterclockwise direction in Fig. 3. It should be emphasized that the operator can hook his thumb around the base of the handle arm 24 and grasp the arm portion 32a with his second finger (left hand) with ample leverage. With arms 31 and 32 cammed apart, the operator then sockets hollow shaft 48 of the blade into opening 39 in frame 37 so that the free end face of rim 50 abuts the floor of cutting head face 20 surrounding stub shaft 26. Release of arm portion 32a then permits the two arms to move together under the action of spring 36 and overlie the rim 50 in positive engagement. It should be noted that the edges of arms 31 and 32 which overlie the rim 50 may be right angled in cross section as seen in Fig. 4. Additionally, the peripheral portion of rim 50 may be right angled. This permits a very positive engagement of the parts and, provided spring 36 is sufficiently powerful, will prevent any disengagement of the blade without positive action by the operator. Once the blade is in place, the operator then recesses handle 43 and the cutting blade of the slicer is ready for action.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In combination, a circular slicer blade, a hollow shaft fixed to the center of one face of said blade, a circumferential rim on the free end of said hollow shaft, a cutting head having a concave inner and a convex outer face, a stub shaft fixed to the inner face of the cutting head adapted to be inserted in the blade hollow shaft, a pair of arms pivotally mounted on the inner face of the cutting head on opposite sides of the stub shaft and spaced outwardly from said inner face a distance at least equal to the circumferential rim thickness on the blade hollow shaft, means resiliently urging the arms normally toward the stub shaft, and means for simultaneously urging the arms away from said stub shaft operable from the outer face of the cutting head.

2. In combination, a circular slicer blade, a hollow shaft fixed to the center of one face of said blade, a circumferential rim on the free end of said hollow shaft, a first gear circumferentially mounted on said hollow shaft, a cutting head having a concave inner and a convex outer face, a drive shaft rotatably mounted on and extending through said cutting head, a second gear adapted to engage the first gear on the drive shaft, a handle fixed to the outer end of said drive shaft, a stub shaft fixed to the inner face of the cutting head adapted to insert in the blade hollow shaft, a pair of arms pivotally mounted on the inner face of the cutting head on opposite sides of the stub shaft and spaced outwardly from the inner face a distance at least equal to the rim thickness, means resiliently urging the arms normally toward the stub shaft and means for simultaneously urging the arms away from the stub shaft operable from the outer face of the cutting head.

3. In combination, a circular slicer blade, a hollow shaft fixedly mounted on the center of one face of said blade, a circumferential rim on the free end of said hollow shaft, a cutting head having a concave inner and a convex outer face, a stub shaft fixed to the inner face of the cutting head adapted to be inserted in the blade hollow shaft, a pair of arms each pivotally mounted on the inner face of the cutting head adjacent one end thereof with the free ends thereof on opposite sides of the stub shaft, means resiliently biasing the free ends of the arms toward the stub shaft, means operable from the outer face of the cutting head for urging one arm away from said stub shaft, means cooperating between said arms whereby to move the other arm away from the stub shaft when the first arm is moved away therefrom.

4. In combination, a circular slicer blade, a hollow shaft fixed to the center of one face of said blade, a circumferential rim on the free end of said hollow shaft, a cutting head having a concave inner face and a convex outer face, a stub shaft fixed to the inner face of said cutting head adapted to be inserted in the blade hollow shaft, a pair of arms pivotally mounted on the inner face of said cutting head on opposite sides of the stub shaft and spaced outwardly from the inner face a distance equal to the rim thickness, means resiliently urging the arms normally toward the stub shaft, means for simultaneously urging the arms away from the stub shaft operable from the outer face of the cutting head, said blade having a ring-shaped recess substantially centrally oriented in the face thereof opposite that mounting said hollow shaft, and ring-shaped grasping means pivotally mounted in said recess.

5. In combination, a circular slicer blade, a hollow shaft fixed to the center of one face of said blade, a circumferential rim on the free rim of said hollow shaft, a cutting head having a concave inner face and a convex outer face, a stub shaft fixed to the inner face of said cutting head adapted to be inserted in the blade hollow shaft, means on the inner face of said cutting head for releasably engaging said hollow shaft when it is positioned over said stub shaft, said means operable from the outer face of said cutting head, and means on the face of said blade opposite that mounting said hollow shaft comprising pivotally mounted finger receiving grasping means normally recessed in said blade but movable from said recess to permit handling of said blade by grasping means.

6. In combination, a circular slicer blade, a hollow shaft fixed to the center of one face of said blade, a circumferential rim on the free end of said hollow shaft, a cutting head having an inner face and an outer face, a stub shaft fixed to the inner face of said cutting head adapted to be inserted in the blade hollow shaft, a pair of arms pivotally mounted on the inner face of said cutting head on opposite sides of the stub shaft and spaced outwardly from the inner face a distance at least equal to the rim thickness, means for simultaneously urging the arms away from the stub shaft including a lever extending through a slot in said cutting head whereby to permit operation of said means from the outer face of said cutting head.

References Cited in the file of this patent
UNITED STATES PATENTS

| | | |
|---|---|---|
| 1,945,127 | Van Berkel | Jan. 30, 1934 |
| 2,514,152 | Darash | July 4, 1950 |
| 2,735,468 | Green et al. | Feb. 21, 1956 |